March 12, 1957 C. H. FAY ET AL 2,785,374
SYSTEM FOR ANALYZING THE COMPOSITION OF FLUID MIXTURES
Filed June 16, 1953 2 Sheets-Sheet 1

Inventors:
Charles H. Fay
Ronald P. Gilmore
By
Their Attorney

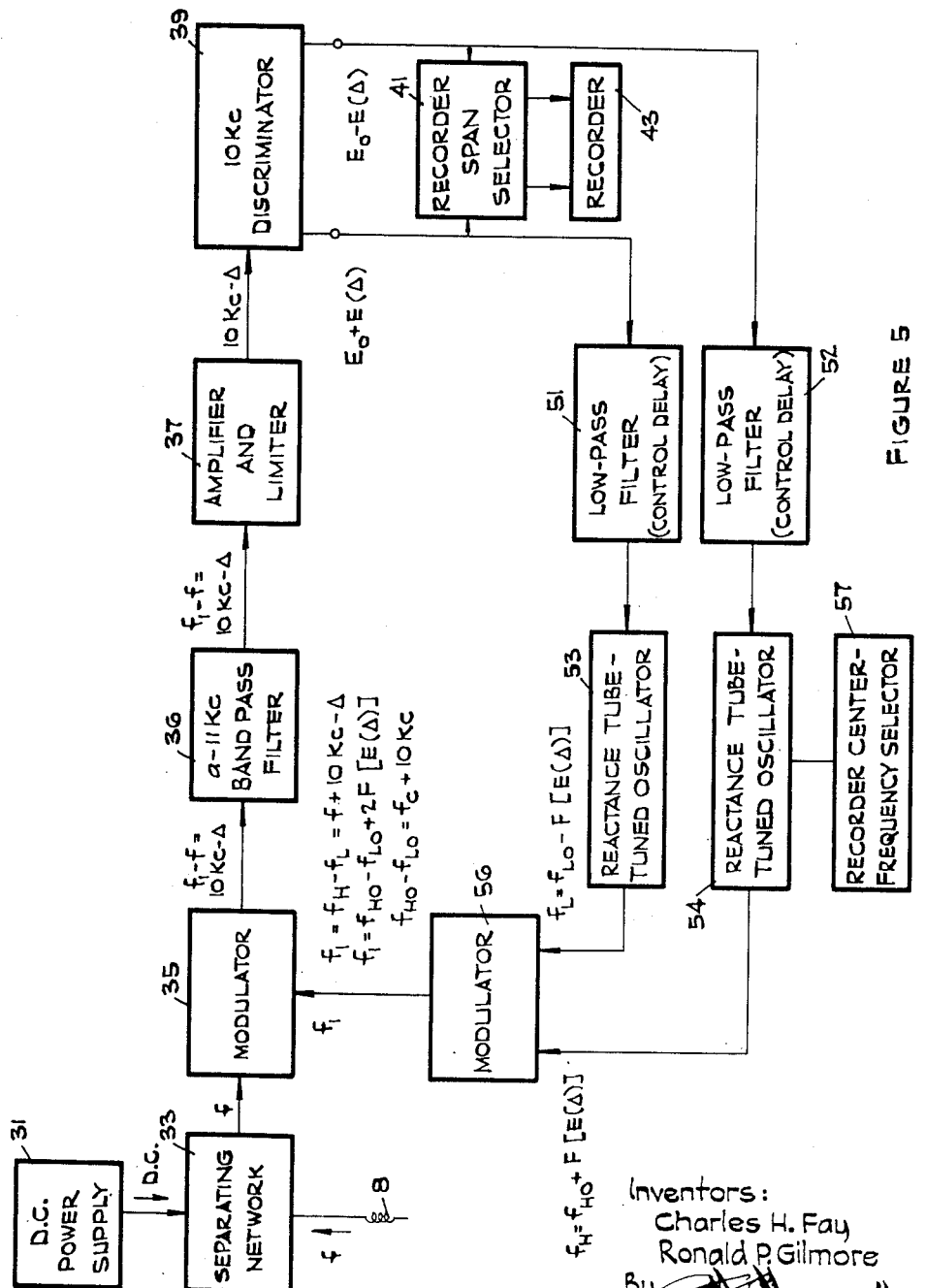

United States Patent Office 2,785,374
Patented Mar. 12, 1957

2,785,374

SYSTEM FOR ANALYZING THE COMPOSITION OF FLUID MIXTURES

Charles H. Fay and Ronald P. Gilmore, Houston, Tex., assignors to Shell Development Company, Emeryville, Calif., a corporation of Delaware Application June 16, 1953, Serial No. 362,062

4 Claims. (Cl. 324—1)

This invention pertains to a system for analyzing the composition of immiscible fluids, and particularly of polyphase streams of such fluids by measuring their dielectric properties. The invention relates more specifically to a system capable of detecting a very small quantity of one fluid in a large volume of another fluid immiscible therewith. The invention finds a particularly advantageous application in a system capable of operating in a deep well and of detecting very small quantities of oil in a fluid column consisting almost exclusively of water, or vice versa.

If an oil well produces excessively high amounts of water with the oil, it may be desired to reduce the water-oil ratio by plugging the well back to a suitable level to shut off the zones of water entry. Care must however be taken to avoid plugging the well back to a level such that some of the oil entry zones are shut off by the same operation, thereby reducing the ultimate recovery from the well.

A number of methods for locating zones of water entry into oil wells have been developed in the past, most of these systems depending on the dilution of a conditioning fluid by the entering water.

While "water witching" methods of this type have usually proved satisfactory for their intended purpose, it must be recognized that at best they provide only indirect information concerning the oil entry zones, so that cases of plug-back operations which reduce oil as well as water production are fairly common. Information on oil as well as on water entry is therefore important in estimating the probable effect of a plug-back or other remedial job.

It is therefore an object of this invention to provide a system capable of detecting the entry or passage of a very small quantity, such even as a single drop of oil or a bubble of gas, into or through the otherwise water-filled sensitive space or volume of said system, and, conversely, of detecting the passage of a small quantity of water through an oil-filled sensitive space or volume.

It is also an object of this invention to provide a system capable of achieving this purpose by means of measurements based on the dielectric properties of the fluids involved.

It is also an object of this invention to provide for these measurements an apparatus comprising capacitor plates completely covered and protected by a sheath of insulating material, whereby said plates cannot be short-circuited by any conductive fluid in which said plates may be immersed, or which may be introduced in whatever amounts between said plates.

It is also an object of this invention to provide an improved electric circuit whereby said capacitor plates may be properly energized and whereby signals therefrom may be suitably telemetered to a remote point for indicating or recording purposes.

These and other objects of this invention will be understood from the following description taken with reference to the attached drawings, wherein:

Fig. 5 is a block diagram of electrical circuits connected at the surface to the conductor cable supporting the housing of Fig. 1.

Figure 1:
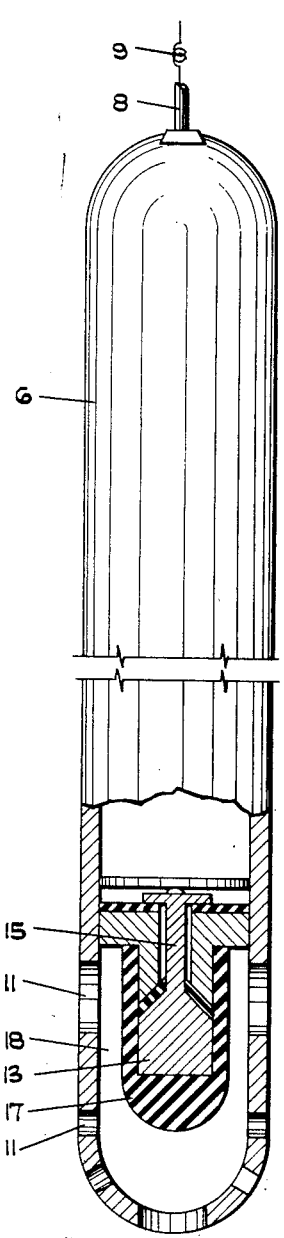
Fig. 1 shows an embodiment of the present invention comprising a housing adapted to be lowered into a well on a conductor cable.

Referring to the drawings, the invention is described for simplicity with regard to a device referred to hereinabove as an oil or water witch, that is, to a device particularly well adapted for use in oil wells. It should however be clearly understood that the invention is in no way limited to use in wells but may well be adapted, by relatively minor changes and re-arrangements of parts, to other desired uses in industrial or scientific work.

Fig. 1, the numeral 6 designates in general a metallic pressure tight housing supported in the well by a cable 8 carrying one or more insulated conductors 9. If an armored cable 8 is used, the sheath may serve as return lead or ground.

The lower portion of the housing 6 is provided with perforations 11, permitting fluid entry to the bottom of the housing. An inner electrode, having a lower enlarged cylindrical portion 13 at the end of a stem 15, is completely protected from direct contact with the well fluid by a covering sheath 17 of an insulating material such as rubber or an equivalent suitable synthetic or polymerized product, especially and preferably such as a polymer of tetrafluoro-ethane technically known as Teflon.

Figure 2:
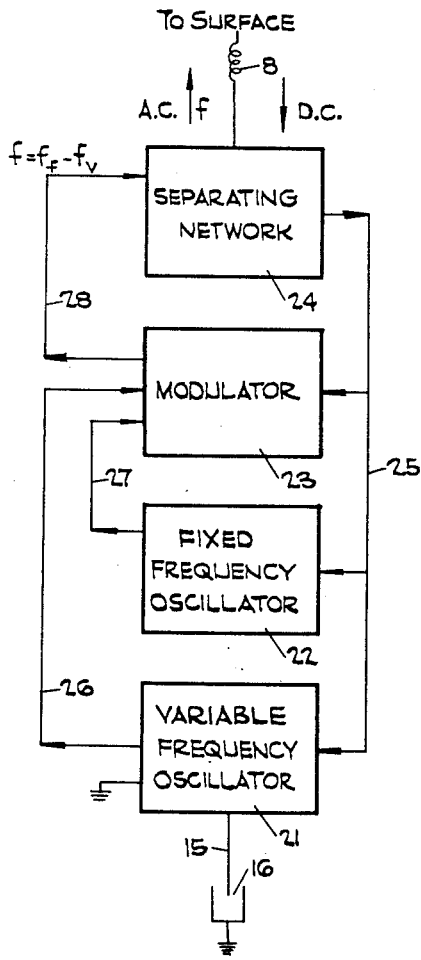
Fig. 2 is a block diagram of the electrical circuits contained in the housing of Fig. 1.

The electrode 13 is suitably insulated from the housing and is electrically connected to form the controlling element of the variable frequency oscillator 21 of Fig. 2. As will be seen from Figs. 1 and 2, the electrode 13 forms one of the plates of a capacitor 16 having a second grounded plate formed by the annular body of the housing 6 around the electrode 13.

The volume of this annular gap around the enlarged cylindrical portion of the electrode 13 forms the sensitive space or volume of the instrument, and is preferably extremely small. In a preferred embodiment of the invention, this volume was chosen so that a 0.05 ml. drop of water occupied 1.3 percent of said sensitive space.

Figure 3:
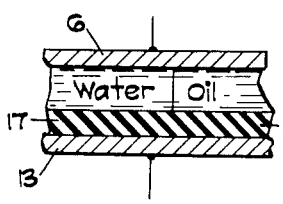
Figs. 3 and 4 are diagrams illustrating two theoretically possible distributions of fluid phases between the plates of a capacitor.
Figure 4:
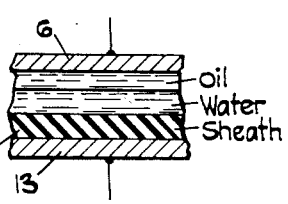

The dielectric sheath 17 insulating the electrode 13 is not only essential in preventing the short-circuiting of the plates of the capacitor 16 by a slug or even a drop of a conductive fluid, such as brine, which may enter the gap 18, but has other essential functions. This will be understood from a discussion of the possible distribution of oil and water between the plates of the capacitor 16, as diagrammatically shown in Figs. 3 and 4, which represent two theoretically extreme cases. In Fig. 3, water and oil are shown as discrete drops or increments of fluids physically adjoining each other and electrically in parallel with each other between the plates 6 and 13 of the capacitor. In Fig. 4, the two fluids are shown arranged in parallel layers electrically in series with each other between the plates of the capacitor.

If fringing effects at oil-water boundaries in Fig. 3 are neglected—which is an approximation justifiable when the mean diameters of individual fluid patches are large in comparison to their thickness—the capacitance $C_p$ as a function of fractional water content $s_w$ is given approximately by $$C_p = C_o + s_w(C_w - C_o) \qquad (1)$$

where $C_o$ is the capacitance for the fluid space completely oil-filled, and $C_w$ the capacitance for the fluid space completely water-filled. It should be pointed out that for brine at low radio frequencies the water is in effect part of the unsheathed outer electrode 6, so that $C_w$ is determined by the dielectric constant and thickness of the sheath 17. The capacitance $C_o$ can be regarded as due to the series combination of two capacitances, one corresponding to the sheath, and the other determined by the dielectric constant and the thickness of the oil. The greater the relative thickness of the sheath, the smaller the ratio $(C_w - C_o)/C_o$.

For the series distribution of Fig. 4, the capacitance $C_s$ is given by $$C_s^{-1} = C_o^{-1} - s_w(C_o^{-1} - C_w^{-1}) \qquad (2)$$

The actual situation can in many cases be regarded as a composite of the series and parallel distributions discussed above. In order to determine how closely the fractional water content, $s_w$, can be derived from capacitance measurements, use may be made of the two equations cited above. Let $s_{wp}$ be the fractional water content calculated from Equation 1, and $s_{ws}$ the fractional water content calculated from Equation 2. It can be shown that $$(s_{ws} - s_{wp})\ \max. = (\sqrt{C_w/C_o} - 1)/(\sqrt{C_w/C_o} + 1) \qquad (3)$$

Thus, the smaller the $(C_w - C_o)/C_o$ ratio, the more reliable the value or estimated $s_w$. In the present apparatus, this ratio—which in the case of distilled water and no sheath on electrode 13 would be about forty—is only about two, so that the average of the results given by Equations 1 and 2 should fall within $\mp 0.08$ of the true value of $s_w$.

It has been found that in general very satisfactory results are obtained when the width of the annular fluid space between the concentric inner and outer electrodes is approximately equal to the width or thickness of the insulator layer covering the inner electrode, which is preferably of the order of from $\frac{1}{16}$ to $\frac{1}{4}$ of an inch.

The circuits whereby the necessary D. C. energizing power may be supplied to the device of the present invention through the conductor cable 8, and whereby signals from said device may be conveyed through the same cable to the surface for indicating and/or recording purposes are shown in the form of bloc diagrams in Figs. 2 and 5. Fig. 2 shows the underground portion of the system carried within the pressure-tight housing 6. Fig. 5 shows the surface portion of said system.

Direct current from a power supply source 31 of Fig. 5 serves to energize the underground portion of the system. After passing through an upper or surface separating network 33, the conductor 8 and the lower or underground separating network 24 of Fig. 2, an operating current of about 60 milliamperes may be delivered by the leads 25 to the variable frequency oscillator 21, the fixed frequency oscillator 22 and the modulator or mixer 23. The modulator 23 produces a difference or beat signal or frequency $f$ from the output $f_t$ of the fixed frequency oscillator 22 and the output $f_v$ of the variable frequency oscillator 21, of which the sensing capacitor 16 forms the frequency controlling component part. In practice, $f_t$ may have a value such as 2.3 megacycles per second and $f_v$ may differ therefrom by from about 50 kc. p. s. for a condition where the fluid between the plates of the capacitor is all oil, to about 150 kc. p. s. for a condition where said fluid is all water.

The use of a beat frequency of about 50–150 kc. p. s. instead of a basic frequency such as 2.3 megacycles per second permits the signals to be transmitted to the surface, through lead 28 and conductor cable 8, without too much attenuation which might otherwise obliterate these signals.

The surface circuit shown in Fig. 5 is a recording frequency meter circuit using electronic automatic tuning and operating briefly as follows. The flow of the energizing D. C. current from the source 31 is not shown in Fig. 5 to simplify the diagram.

The incoming signal of frequency $f$ arriving through the cable 8 and the surface separating network 33, is combined in the modulator 35 with a frequency $f_1$ which is automatically varied proportionally to the frequency variations of the signal $f$ in a manner to appear hereinbelow. This combination or difference-frequency signal has a frequency which deviates from center-frequency of the discriminator 39 (which center frequency may have a value such as 10 kc.) by a small amount $\Delta$, so that:

$$f_1 - f = 10 \text{ kc.} - \Delta$$

This difference-frequency signal is delivered through a band-pass filter 36 and an amplifier and limiter 37 to the discriminator 39. The discriminator 39 produces direct current control voltages $E_o + E(\Delta)$ and $E_o - E(\Delta)$, $E(\Delta)$ representing the variable part of the output voltage, the magnitude of which is substantially proportional to the frequency $\Delta$, that is, to the deviation of the difference-frequency signal $f_1 - f$ from the center frequency of the discriminator 39 (10 kc. in the example used). It will be seen that the potential difference $2E(\Delta)$ appears across the input terminals of the recorder span selector 41. Span selector 41 is a stepwise adjustable attenuator, by means of which a chosen fraction of said potential difference is applied to recorder 43. Recorder 43 therefore records the voltage $E(\Delta)$ multiplied by a selected factor. The control voltages $E_o + E(\Delta)$ and $E_o - E(\Delta)$, after passing through the low-pass filter and control delay units 51 and 52, are applied to the reactance-tube-tuned oscillators 53 and 54 to shift the output frequencies $f_L$ and $f_H$ of these oscillators by an amount or frequency $F$ which is a function of the voltage $E(\Delta)$ and which may be expressed by the following notation:

$$f_L = f_{LO} - F[E(\Delta)]$$
$$f_H = f_{HO} + F[E(\Delta)]$$

wherein the frequencies $f_{LO}$ and $f_{HO}$ are the frequencies of the oscillators 53 and 54 respectively at a moment where the signal supplied to the discriminator 39 is exactly at its center frequency, that is, when the deviation $\Delta = 0$. Since the frequencies $f_L$ and $f_H$ are mixed by the modulator 56 to produce the signal $f_1$, the described action of the system results in shifting the frequency of $f_1$ in the same direction in which the frequency $f$, with which $f_1$ is mixed in unit 35, is shifting. The steady-state condition maintained by the present control system may be given by the expression:

$$f - f_c = 2F[E(\Delta)] + \Delta$$

wherein $f_c$ is the frequency of the incoming signal from the well for which $\Delta = 0$ and $E(\Delta) = 0$. This frequency, which is recorded at the center zero of the recorder, can be chosen at will within the range of the auxiliary tuning provided by a recorder center-frequency selector 57. Since the frequency $2F[E(\Delta)]$ is much higher than the frequency $\Delta$, the linearity of the recorder is insensitive to the linearity of the voltage $E(\Delta)$, but depends directly on the linearity of the frequency $2F(E)$, the frequency shift in $f_1$ produced by the control voltages $+E$ and $-E$.

The recorder input is taken off ahead of the control delay filtering units 51 and 52 in order to provide high-frequency preemphasis which compensates for the sometimes sluggish response of some types of recorders.

The following numerical example may be used to illustrate the operation of the present system.

Assume that the signal received at the surface from the cable 8 during a given interval has a frequency $f = 100$ kc. Reactance-tube-tuned oscillator 53, which is not necessarily provided with adjustable auxiliary tuning might have a basic frequency $f_{LO}$ of 5983 kc. (its exact value is unimportant). Oscillator 54 may then be tuned if desired by means of recorder center-frequency selector 57 to have a basic frequency $f_{HO}$ of 6093 kc., so that $f_{HO} - f_{LO} = 110$ kc., whence $f_c=100$ kc.$=f$, and $\Delta=0$. The reading of recorder 43 is evidently brought to zero by this adjustment, which indeed is most conveniently made by observing the recorder reading as the tuning is changed.

Suppose now that the value of the signal frequency $f$ increases suddenly to a value such as 101 kc. In that event, $f_1-f$ momentarily becomes 110 kc.—101 kc.=9 kc.=10 kc.—$\Delta$ whence $\Delta=1$ kc. momentarily. At a rate determined by control delay filtering units 51 and 52, the control voltage applied to oscillator 53 will become more positive, that to oscillator 54 more negative, so that $f_L$ becomes smaller and $f_{II}$ becomes larger, $f_1$ hence becoming larger, and $\Delta$ therefore smaller, as the system approaches a new steady-state condition as determined by the equation $f-f_c=2F[E(\Delta)]+\Delta$. By way of illustration, suppose that $2F[E(\Delta)]=99\Delta$, i. e., that the "frequency amplification" of the combined discriminator-controlled-oscillators system is 99. Then for $f_c=100$ kc., $f=101$ kc., $\Delta=0.01$ kc. at steady state. It will be seen that for the previously cited range of 50 to 150 kc. for $f$, and $f_c=100$ kc., the steady-state deviation $\Delta$ will range from $-0.5$ to $+0.5$ kc., so that $f_1f=10$ kc.—$\Delta$ remains well within the pass band of filter 36.

It remains to discuss the behavior of recorder 43 after the above-discussed increase of $f$ from 100 to 101 kc. Since $\Delta$ is momentarily 1 kc., recorder 43 will begin to deflect in accordance with an impressed voltage proportional to E(1 kc.). Its final deflection, however, will correspond to E(0.01 kc.). Under certain conditions the recorder might seriously overshoot in such a situation. If its period and damping are compatible with the time constants of control delay filtering units 51 and 52, however, the result is an improved dynamic response.

We claim as our invention:

1. In a system for determining the composition of fluids in a borehole, a housing adapted to be lowered into said borehole on a conductor cable, a capacitor having plates mounted in said housing in contact with said fluid, said fluid forming the dielectric between said plates, at least one of the plates being covered with an insulator material completely protecting said plate from contact with the fluid, a fixed frequency oscillator and a variable frequency oscillator carried in said housing, said capacitor being connected to said variable frequency oscillator to control the frequency thereof, a modulator circuit having its input connected to the outputs of the two oscillators to obtain a beat signal therefrom, and frequency metering means at the surface connected through said conductor cable to the output of said modulator circuit, said frequency metering means comprising a primary modulator receiving its input from said conductor cable, a frequency discriminator receiving its input from said primary modulator, said discriminator having a predetermined center frequency, a first and a second control delay low-pass filters connected to the output terminals of said discriminator, the voltage passed by said first filter increasing with a decrease of the output frequency of the discriminator to a value below that of said center frequency, and decreasing with its increase to a value above that of said center frequency, the voltage passed by said second filter increasing with an increase of the output frequency of the discriminator to a value above that of said center frequency, and decreasing with its decrease to a value below that of said center frequency, an oscillator connected to have its frequency controlled by said first discriminator voltage, a second oscillator connected to have its frequency controlled by said second discriminator voltage, a secondary modulator having its input connected to the outputs of the two oscillators in parallel, the output of the secondary modulator being connected to the input of the primary modulator, and indicator means having their input connected across the output terminals of the discriminator.

2. In a system for determining the composition of fluids in a borehole, a housing adapted to be lowered into said borehole on a conductor cable, a capacitor having plates mounted in said housing in contact with said fluid, said fluid forming the dielectric between said plates, at least one of the plates being covered with an insulator material completely protecting said plate from contact with the fluid, a fixed frequency oscillator and a variable frequency oscillator carried in said housing, said capacitor being connected to said variable frequency oscillator to control the frequency thereof, a modulator circuit having its input connected to the outputs of the two oscillators to obtain a beat signal therefrom, and frequency metering means at the surface connected through said conductor cable to the output of said modulator circuit, said frequency metering means comprising a primary modulator receiving its input from said conductor cable, a frequency discriminator receiving its input from the output of said primary modulator, said discriminator having a predetermined center frequency, two oscillators each connected to one of the terminals of said discriminator, the frequency of said oscillators being controlled by the voltage applied thereto from said terminals, a secondary modulator having its input connected to the outputs of said two oscillators, the output of the secondary modulator being connected to the input of the primary modulator, and indicator means having their input connected across the output terminals of the discriminator.

3. In a system for determining the composition of fluids in a borehole, a housing adapted to be lowered into said borehole on a conductor cable, a capacitor having an inner cylindrical plate and an outer annular plate concentrically mounted in said housing in contact with said fluid, said fluid forming the dielectric between said plates, the inner plate being covered with a layer of an insulator material of a thickness of from $\frac{1}{16}$ to $\frac{1}{4}$ inch, and the outer plate being separated therefrom by an annular fluid space of a width of from $\frac{1}{16}$ to $\frac{1}{4}$ inch, said outer plate being maintained at ground potential, a fixed frequency oscillator and a variable frequency oscillator carried in said housing, said capacitor being connected to said variable frequency oscillator to control the frequency thereof, a modulator circuit having its input connected to the outputs of the two oscillators to obtain a beat signal therefrom, and frequency metering means at the surface connected through said conductor cable to the output of said modulator circuit.

4. In a system for determining the composition of fluids in a borehole, a housing adapted to be lowered into the borehole on a conductor cable, a capacitor having an inner cylindrical plate covered with a layer of an insulator material, and an outer annular plate concentric with the inner plate and separated therefrom by an annular space having a thickness approximately equal to the thickness of the insulator material covering the inner electrode, the fluid in said annular space forming the dielectric between said plates, a fixed frequency oscillator and a variable frequency oscillator carried in said housing, said capacitor being connected to said variable frequency oscillator to control the frequency thereof, a modulator circuit having its input connected to the outputs of the two oscillators to obtain a beat signal therefrom, and frequency metering means at the surface connected through said conductor cable to the output of said modulator circuit.

References Cited in the file of this patent

UNITED STATES PATENTS

| | | |
|---|---|---|
| 2,266,114 | Bartlett | Dec. 16, 1941 |
| 2,330,394 | Stuart | Sept. 28, 1943 |
| 2,387,496 | Cornelius | Oct. 23, 1945 |
| 2,577,612 | Fay | Dec. 4, 1951 |
| 2,613,249 | Babb | Oct. 7, 1952 |
| 2,654,067 | Bruce | Sept. 29, 1953 |